F. P. ROBERTS.
AUTOMOBILE HEADLIGHT CONTROL MECHANISM.
APPLICATION FILED FEB. 3, 1912.
1,139,230.
Patented May 11, 1915.
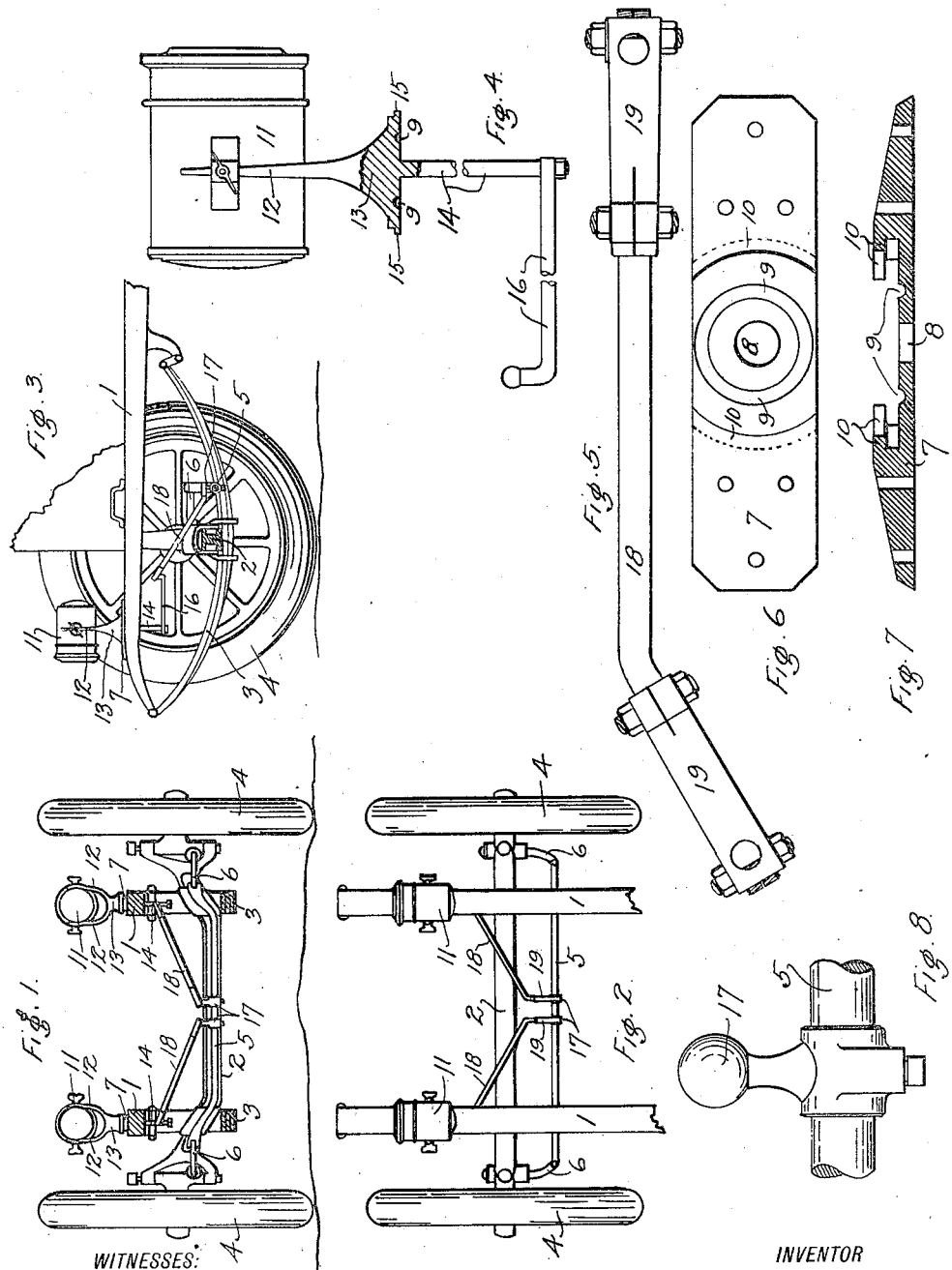
WITNESSES:
M. J. McNeil
J. S. Ellsworth
INVENTOR
Frank P. Roberts
BY
P. L. Elliott
ATTORNEY

UNITED STATES PATENT OFFICE.

FRANK P. ROBERTS, OF TACOMA, WASHINGTON.

AUTOMOBILE HEADLIGHT-CONTROL MECHANISM.

1,139,230.      Specification of Letters Patent.      Patented May 11, 1915.

Application filed February 3, 1912. Serial No. 675,231.

*To all whom it may concern:*

Be it known that I, FRANK P. ROBERTS, a citizen of the United States, residing at Tacoma, in the county of Pierce and State of Washington, have invented a new and useful Automobile Headlight-Control Mechanism, of which the following is a specification.

This invention relates to automobile head-lights and has for its objects to provide a means of mounting the head-light on the machine whereby it may be turned on a vertical axis to direct its rays sidewise out of the direction of travel of the machine as a whole; and means for automatically turning the said head-light in substantially the direction in which the front, or steering, wheels of the machine are turned thereby illuminating the way to be traveled by the machine before the machine has fully turned thereinto.

I attain these and other objects by the devices, mechanisms and arrangements illustrated in the accompanying drawing, in which—

Figure 1 is a vertical cross-section of a portion of an automobile, said section being made to the rear of the front axle and looking forward thereat; Fig. 2 is a plan thereof; Fig. 3 is a vertical longitudinal section thereof; Fig. 4 is a side elevation of a lamp with its support; Fig. 5 is an elevation of the operating rod; Fig. 6 is a plan of one of the lamp-holder bases; Fig. 7 is a vertical section thereof; and Fig. 8 is an elevation of one of the operating knobs.

Similar numerals of reference refer to similar parts throughout the several views.

In the drawings, the automobile is represented as having two main frame beams 1, extending longitudinally, and supported in front from the fixed axle 2 by means of springs 3. The front wheels 4 are mounted on the usual trunnions or pins, which pins are pivoted to the ends of the axle 2 in the usual way. The direction of the wheels is controlled by a connecting rod 5 which is secured at its ends to the levers 6 which are secured to and which direct the position of the wheel trunnions, so that lateral motion of the rod 5 results in turning the plane of rotation of the wheels 4 to one side or the other. Thus far the mechanism is that in common use at the present time. Now, on each beam 1 is secured a lamp-holder base 7, having a central vertical hole 8 therethrough and having its central portion depressed and provided with a circular groove or ball race 9, and terminated in front and rear by the overhanging lugs 10 extending from side to side of the base 7. The ball race 9 and the lugs 10 are arranged concentric with the hole 8.

The lamp or head-light 11 may be of any approved construction and is mounted on the two tines 12 extending upward from the lamp holder 13. The lower portion of the holder 13 is shaped, in plan, similar to the base—that is to say, it has its front and rear portions circular in plan and adapted to fit under the lugs 10, while its sides are straight and parallel and of such distance apart that it may be inserted between the lugs 10 when it is turned at right-angles to its normal position. It has a central pin 14 extending therefrom downward through the hole 8, and lugs 15 extending under the lugs 10 of the base, when it is in operative position, and it is free to turn about the central axis of the hole 8. Suitable balls are arranged in the ball race 9 between the base 7 and the holder 13. The lower end of the pin 14 has a rearwardly extending lever 16 secured thereto and said lever is provided with a ball-shaped upturned end. A suitable knob 17 is adjustably secured to the connecting rod 5 near its center. An operating rod 18 is provided with sockets 19 at each end, said sockets being respectively adapted to engage the knob 17 and the ball on the end of the lever 16. Similar mechanism connects the rod 5 with the other lamp. Thus it will be seen that lateral motion of the rod 5 will be transmitted to the levers 16 and produce corresponding rotary motion of the pins 14 and of the lamps 11, thus directing the head-lights in lines substantially parallel with that assumed by the front wheels of the car so that the direction in which the machine is steered is illuminated before the car assumes that direction.

Having described my invention, what I claim is:

1. In combination with a vehicle having a frame beam, a base mounted thereon, said beam and base having alining openings extending therethrough, a ball race on said base, arcuate recesses on the opposing sides of said opening in said base concentric to said ball race, said base having parallel sides, a lamp stand formed in conformity with said base and having sides parallel with said base sides, arcuate tongues adapted to operate in said recesses, said stand having a central pin adapted to project through said openings and a right angular arm on said pin whereby said stand may be rotated.

2. In combination with a vehicle having a frame beam, a base mounted thereon, said beam and base having alining openings extending therethrough, a ball race on said base, arcuate recesses on the opposing sides of said opening in said base concentric to said ball race, said base having parallel sides, a lamp stand formed in conformity with said base and having sides parallel with said base sides, arcuate tongues adapted to operate in said recesses, said stand having a central pin adapted to project through said openings and a right angular arm on said pin and means for rotating said stand in unison with the steering mechanism of said vehicle.

FRANK P. ROBERTS.

Witnesses:
M. F. McNeil,
Frank E. Lockwood.